(12) United States Patent
Vetters et al.

(10) Patent No.: US 8,021,267 B2
(45) Date of Patent: Sep. 20, 2011

(54) COUPLING ASSEMBLY

(75) Inventors: Daniel K. Vetters, Indianapolis, IN (US); Robert W. Cedoz, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 460 days.

(21) Appl. No.: 12/332,916

(22) Filed: Dec. 11, 2008

(65) Prior Publication Data

US 2010/0151985 A1 Jun. 17, 2010

(51) Int. Cl.
*F16H 57/08* (2006.01)
*F16D 3/00* (2006.01)
(52) U.S. Cl. .......................................... 475/347; 464/98
(58) Field of Classification Search .................. 475/346, 475/347
See application file for complete search history.

(56) References Cited

U.S. PATENT DOCUMENTS

| | | | |
|---|---|---|---|
| 2,937,827 A | 5/1960 | Duce | |
| 3,217,517 A | 11/1965 | Warnery | |
| 3,646,834 A | 3/1972 | Davis | |
| 3,766,972 A * | 10/1973 | Kitano et al. | 165/8 |
| 3,884,087 A * | 5/1975 | Sakaki | 74/63 |
| 4,817,382 A | 4/1989 | Rudolph et al. | |
| 5,079,916 A | 1/1992 | Johnson | |
| 5,120,516 A | 6/1992 | Ham et al. | |
| 5,186,609 A | 2/1993 | Inoue et al. | |
| 5,813,214 A | 9/1998 | Moniz et al. | |
| 6,010,304 A | 1/2000 | Moniz et al. | |
| 6,071,076 A | 6/2000 | Ansari et al. | |
| 6,186,922 B1 | 2/2001 | Bursal et al. | |
| 6,478,641 B2 | 11/2002 | Jordan | |
| 6,546,735 B1 | 4/2003 | Moniz et al. | |
| 6,619,030 B1 | 9/2003 | Seda et al. | |
| 6,620,049 B1 * | 9/2003 | Kundermann | 464/98 |
| 6,684,626 B1 | 2/2004 | Orlando et al. | |
| 6,711,887 B2 | 3/2004 | Orlando et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 6,935,837 B2 | 8/2005 | Moniz et al. | |
| 7,007,488 B2 | 3/2006 | Orlando et al. | |
| 7,096,674 B2 | 8/2006 | Orlando et al. | |
| 7,144,349 B2 | 12/2006 | Mitrovic | |
| 7,186,073 B2 | 3/2007 | Orlando et al. | |
| 7,195,446 B2 | 3/2007 | Seda et al. | |
| 7,195,447 B2 | 3/2007 | Moniz et al. | |

(Continued)

*Primary Examiner* — Dirk Wright
(74) *Attorney, Agent, or Firm* — Krieg DeVault LLP

(57) ABSTRACT

A coupling assembly for transmitting torque between a first body and a second body is disclosed herein. The coupling assembly includes a diaphragm plate extending radially between a radially inner periphery fixed for rotation with the first body. The diaphragm plate extends to a radially outer periphery and is operable to elastically deform in response to changes in the axial positions of the first and second bodies relative to one another. The coupling assembly also includes a socket assembly engaged with the radially outer periphery of the first diaphragm plate for concurrent axial movement in response to changes in the axial positions of the first and second bodies relative to one another. The socket assembly is also operable to transmit torque between the second body and the diaphragm plate. The socket assembly includes a radially-accommodating structure operable to at least partially move in response to changes in an outer profile of the second body. The diaphragm plate and the socket assembly are engaged such that the socket assembly does not impart loading on the diaphragm plate in response to changes in the outer profile of the second body.

21 Claims, 9 Drawing Sheets

U.S. PATENT DOCUMENTS

| | | |
|---|---|---|
| 7,269,938 B2 | 9/2007 | Moniz et al. |
| 7,290,386 B2 | 11/2007 | Orlando et al. |
| 7,296,398 B2 | 11/2007 | Moniz et al. |
| 7,334,392 B2 | 2/2008 | Moniz et al. |
| 7,334,981 B2 | 2/2008 | Moniz et al. |
| 7,353,647 B2 | 4/2008 | Orlando et al. |
| 7,458,202 B2 | 12/2008 | Moniz et al. |
| 7,490,460 B2 | 2/2009 | Moniz et al. |
| 7,490,461 B2 | 2/2009 | Moniz et al. |
| 7,493,753 B2 | 2/2009 | Moniz et al. |
| 7,493,754 B2 | 2/2009 | Moniz et al. |
| 7,510,371 B2 | 3/2009 | Orlando et al. |
| 7,513,102 B2 | 4/2009 | Moniz et al. |
| 7,513,103 B2 | 4/2009 | Orlando et al. |
| 7,526,913 B2 | 5/2009 | Orlando et al. |
| 2003/0163984 A1 | 9/2003 | Seda et al. |
| 2004/0020186 A1 | 2/2004 | Orlando et al. |
| 2006/0288686 A1 | 12/2006 | Cherry et al. |
| 2007/0084183 A1 | 4/2007 | Moniz et al. |
| 2007/0084186 A1 | 4/2007 | Orlando et al. |
| 2007/0087892 A1 | 4/2007 | Orlando et al. |
| 2007/0125066 A1 | 6/2007 | Orlando et al. |
| 2007/0137175 A1 | 6/2007 | Moniz |
| 2007/0157596 A1 | 7/2007 | Moniz |
| 2007/0234704 A1 | 10/2007 | Moniz et al. |
| 2007/0240399 A1 | 10/2007 | Orlando et al. |
| 2008/0014095 A1 | 1/2008 | Moniz et al. |
| 2008/0053099 A1 | 3/2008 | Venkataramani et al. |
| 2008/0053100 A1 | 3/2008 | Venkataramani et al. |
| 2008/0072567 A1 | 3/2008 | Moniz et al. |
| 2008/0072568 A1 | 3/2008 | Moniz et al. |
| 2008/0072569 A1 | 3/2008 | Moniz et al. |
| 2008/0075590 A1 | 3/2008 | Moniz et al. |
| 2008/0098713 A1 | 5/2008 | Orlando et al. |
| 2008/0098714 A1 | 5/2008 | Orlando et al. |
| 2008/0098715 A1 | 5/2008 | Orlando et al. |
| 2008/0098716 A1 | 5/2008 | Orlando et al. |
| 2008/0098717 A1 | 5/2008 | Orlando et al. |
| 2008/0098718 A1 | 5/2008 | Henry et al. |
| 2008/0110152 A1 | 5/2008 | Kemper et al. |
| 2008/0110153 A1 | 5/2008 | Seda et al. |
| 2008/0110154 A1 | 5/2008 | Kemper et al. |
| 2008/0112791 A1 | 5/2008 | Lee et al. |
| 2008/0112793 A1 | 5/2008 | Lee et al. |
| 2008/0112794 A1 | 5/2008 | Lee et al. |
| 2008/0112795 A1 | 5/2008 | Lee et al. |
| 2008/0112801 A1 | 5/2008 | Moniz et al. |
| 2008/0112802 A1 | 5/2008 | Orlando et al. |
| 2008/0148708 A1 | 6/2008 | Chou et al. |
| 2008/0148881 A1 | 6/2008 | Moniz et al. |
| 2008/0152477 A1 | 6/2008 | Moniz et al. |
| 2008/0159851 A1 | 7/2008 | Moniz et al. |
| 2008/0159852 A1 | 7/2008 | Stephenson et al. |
| 2008/0159856 A1 | 7/2008 | Moniz et al. |
| 2009/0064683 A1 | 3/2009 | Moniz et al. |

* cited by examiner

US 8,021,267 B2

COUPLING ASSEMBLY

BACKGROUND OF THE INVENTION

1. Field of the Invention

The invention relates to coupling two substantially cylindrical bodies, such as shafts, gears or other bodies, and more particularly provides an embodiment operable to concurrently drive two counter-rotating shafts, such as propeller shafts of an air or sea craft.

2. Description of Related Prior Art

U.S. Pat. No. 4,817,382 discloses a turboprop propulsion apparatus. A turboprop propulsion apparatus is one of numerous applications in which two shafts are coupled together. The turboprop propulsion apparatus of the '382 patent includes a core engine that is connected through a planetary drive transmission to counter-rotating propellers. One of the propellers is connected to the ring gear and the other is connected to the planetary gear carrier.

SUMMARY OF THE INVENTION

In summary, the invention is a coupling assembly for transmitting torque between a first body and a second body. The coupling assembly includes a diaphragm plate extending radially between a radially inner periphery fixed for rotation with the first body. The diaphragm plate extends to a radially outer periphery and is operable to elastically deform in response to changes in the axial positions of the first and second bodies relative to one another. The coupling assembly also includes a socket assembly engaged with the radially outer periphery of the first diaphragm plate for concurrent axial movement in response to changes in the axial positions of the first and second bodies relative to one another. The socket assembly is also operable to transmit torque between the second body and the diaphragm plate. The socket assembly includes a radially-accommodating structure operable to at least partially move in response to changes in an outer profile of the second body. The diaphragm plate and the socket assembly are engaged such that the socket assembly does not impart loading on the diaphragm plate in response to changes in the outer profile of the second body.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENTS

Figure 1:
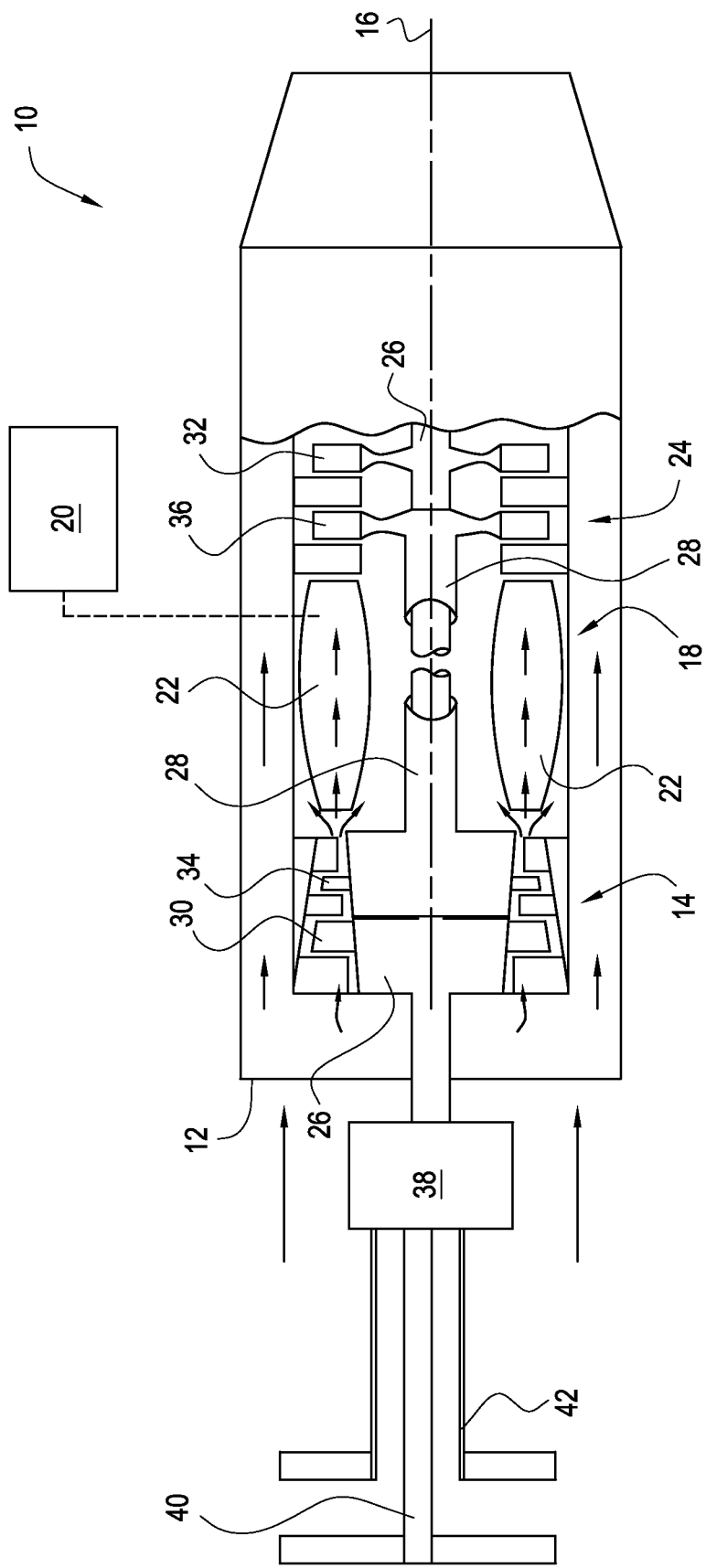
FIG. 1 is a schematic of a turbine engine which incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

FIG. 1 schematically shows a turbine engine 10. The various unnumbered arrows represent the flow of fluid through the turbine engine 10. The turbine engine 10 can produce power for different kinds of applications, including vehicle propulsion and power generation among others. The exemplary embodiments of the invention disclosed herein, as well as other embodiments of the broader invention, can be practiced in any configuration of turbine engine and in any application other than turbine engines in which torque is transmitted between two substantially cylindrical bodies. The embodiments of the invention can be applied in operating environments wherein the axial distance between the bodies can change and wherein an outer shape of profile of one of the bodies can change.

The exemplary turbine engine 10 can include an inlet 12 to receive fluid such as air. The turbine engine 10 may include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. The shaft 28 can also support high pressure turbine blades 36 of a high pressure portion of the turbine section 24.

The low pressure shaft 26 can drive other structures, such as a gear train, a fan, a propeller shaft, a rotor, a tower shaft or any other shaft, or any other structure. In the schematic view of FIG. 1, the low pressure shaft 26 can be coupled to a propeller gear box assembly 38. The propeller gear box assembly 38 can transmit torque/rotation from the low pressure shaft 26 to first and second output propeller shafts 40, 42. The exemplary shafts 40, 42 are shown aligned with the engine 10, but other embodiments could have propeller shafts that are not aligned with the engine centerline axis 16. Also, in alternative embodiments of the invention, the propeller gear box assembly 38 can receive input power from structures other than the low pressure shaft 26. The propeller shafts 40, 42 are shown in a tractor arrangement in FIG. 1. In alternative embodiments of the invention, the propeller shafts 40, 42 can be disposed in a pusher arrangement.

Figure 2:
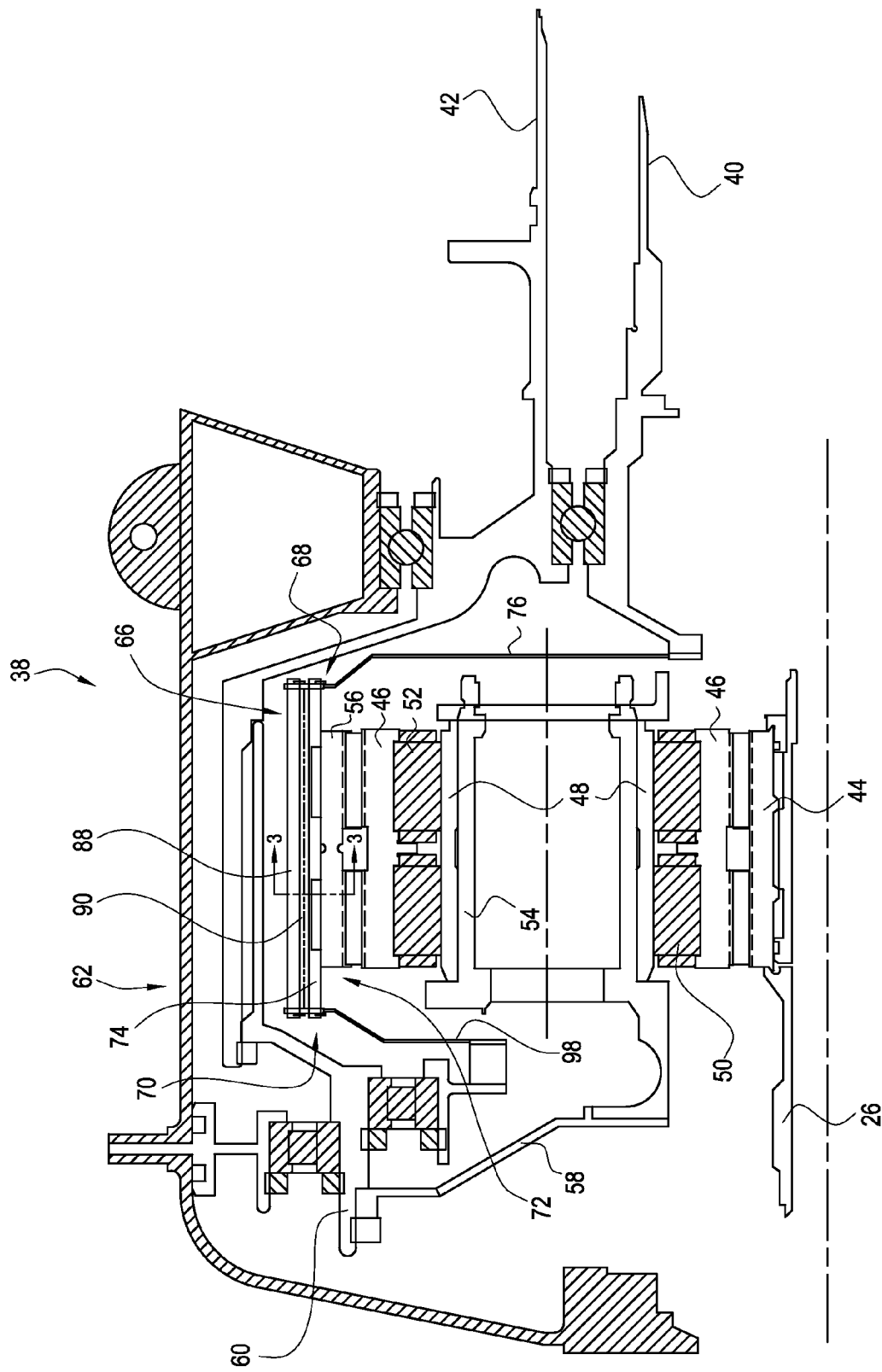
FIG. 2 is an axial cross-section of another exemplary embodiment of the invention.

In FIG. 2, the propeller gear box assembly 38 can include an end portion of the input shaft 26. A sun gear 44 can be engaged with the shaft 26 for concurrent rotation. A plurality of planetary gears, such as the planetary gear 46, can be meshed with the sun gear 44 and be operable to orbit about the sun gear 44. The planetary gear 46 can be mounted on a lay shaft 48 and supported by bearings 50, 52. A planetary gear carrier 54 can couple all of the planetary gears meshed with the sun gear 44, including the planetary gear 46. A ring gear 56 can surround the plurality of planetary gears, including the planetary gear 46.

The propeller gear box assembly 38 can transmit power to both shafts 40, 42. In the embodiment shown in FIG. 2, generally around 60% of the power received from the input shaft 26 can be transmitted to the shaft 42 and around 40% of the power received from the input shaft 26 can be transmitted to the shaft 42. Assuming a pusher configuration, the shaft 42 can turn the forward-most or primary propellers and the shaft 40 can turn the aft-most or counter-rotating propellers. Power can be transmitted to the shaft 42 through the planetary gear carrier 54 as well as structures 58 and 60.

Figure 3:
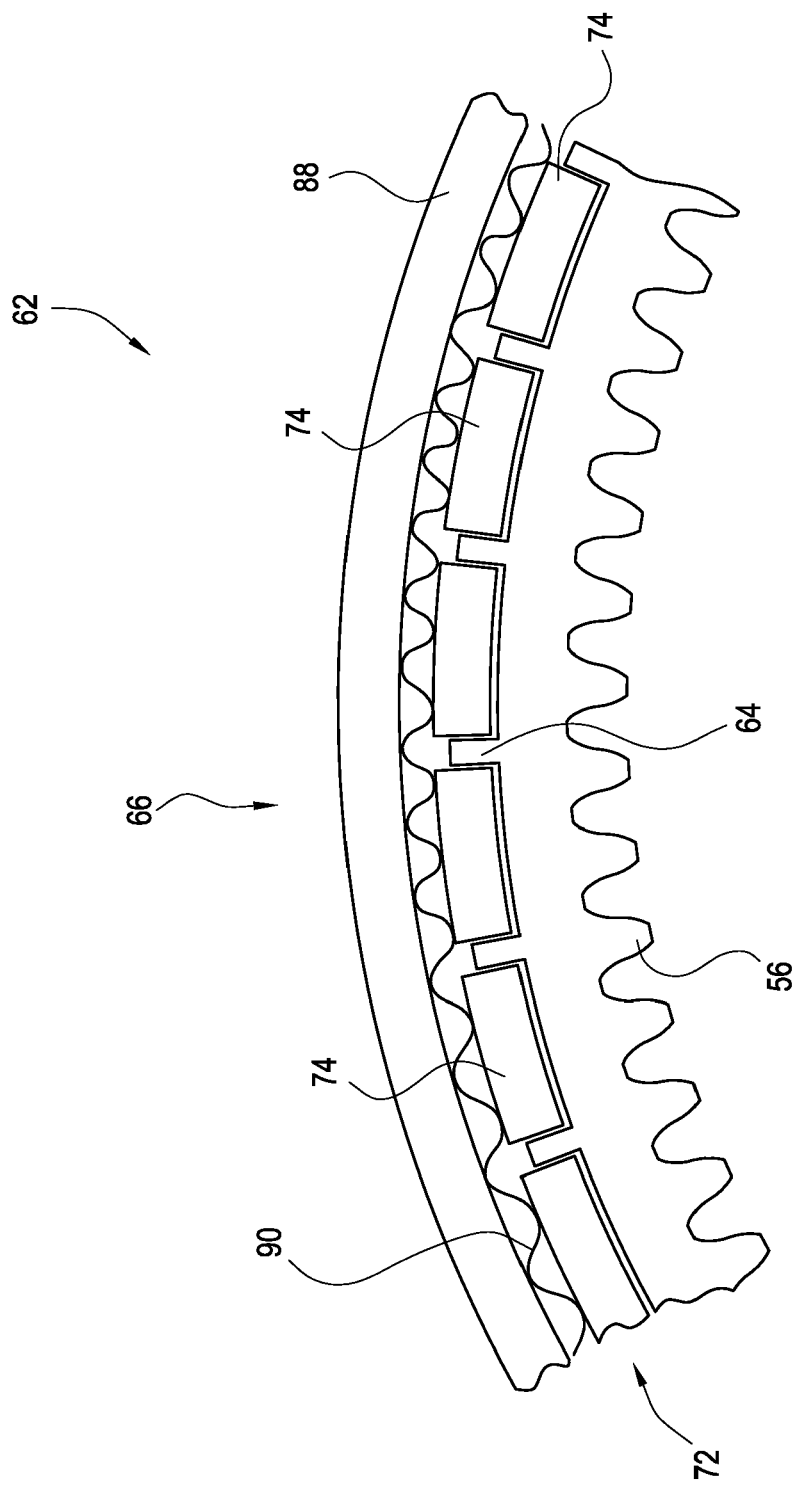
FIG. 3 is a cross-section taken through section lines 3-3 in FIG. 2.

Power can be transmitted to the shaft 40 through the ring gear 56 and a coupling assembly 62, which includes a socket assembly 66 and a diaphragm plate 76. Referring now to FIG. 3, the exemplary ring gear 56 can include a plurality of tabs 64 projecting radially outward. The socket assembly 66 can define an aperture receiving the ring gear 56. Referring again to FIG. 2, the socket assembly 66 can extend axially between a first end 68 and a second end 70.

Referring again to FIG. 3, the socket assembly 66 can include a radially-accommodating structure 72 operable engage the ring gear 56 such that the coupling assembly 62 is driven in rotation by the ring gear 56. In the first exemplary embodiment of the invention, the radially-accommodating structure 72 can be defined by a plurality of torque-transferring members 74. Each torque-transferring member 74 can be positioned between two adjacent tabs 64 of the ring gear 56. Each of the plurality of members 74 can be individually moveable relative to one another.

Referring again to FIG. 2, the coupling assembly 62 can also include a first diaphragm plate 76 extending radially between a radially inner periphery fixed to the shaft 40 and a radially outer periphery axially fixed to the socket assembly 66. The first end 68 of the socket assembly 66 can be engaged with the radially outer periphery of the first diaphragm plate 76 for concurrent axial movement in response to changes in the axial positions of the ring gear 56 and the shaft 40 relative to one another. The ring gear 56 and the shaft 40 can be two bodies and the diaphragm plate 76 can be an axially-accommodating structure between the two bodies. The first diaphragm plate 76 is operable to bend in response to changes in the axial positions of the shaft 40 and the ring gear 56 relative to one another. The deformation is elastic; the first diaphragm plate 76 can return to an original shape.

Figure 4:
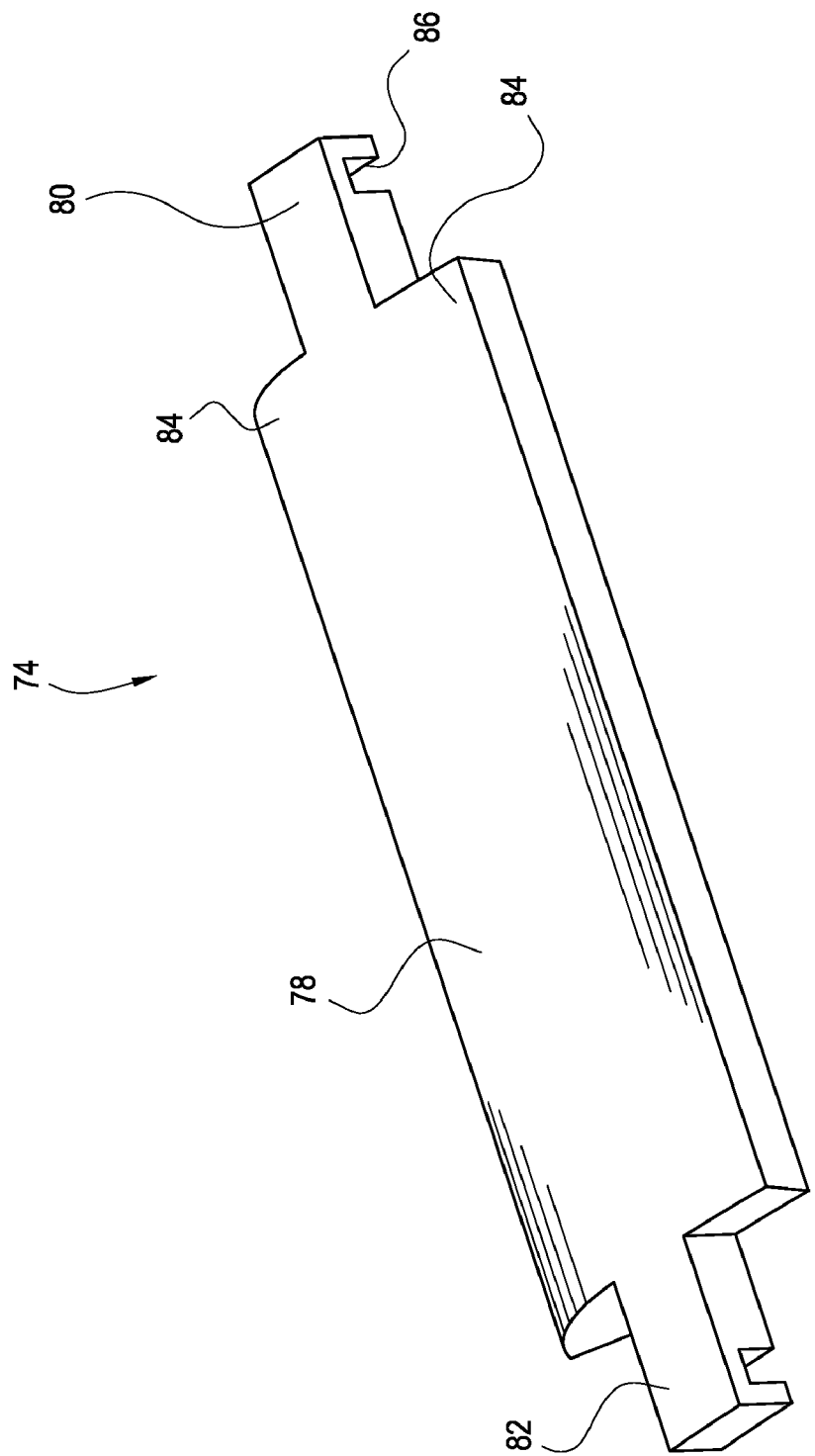
FIG. 4 is a perspective view of an exemplary torque-transferring member associated with the first exemplary embodiment of the invention.

As best shown in FIG. 4, each of the plurality of members 74 can include a body 78. A first arm 80 can extend from one end of the body 78 and a second arm 82 can extend from the other end of the body 78. The first arm 80 can be received in slots (visible in FIG. 2) in the first diaphragm plate 76 (referenced in FIG. 2). A pair of shoulders 84 can be defined at the end of the body 78 and these shoulders 84 can abut the first diaphragm plate 76 (referenced in FIG. 2). A notch 86 can be defined in the first arm 80 to receive a retaining ring (not shown) to keep the first arm 80 from moving out of the slot (visible in FIG. 2) in the first diaphragm plate 76 (referenced in FIG. 2).

Referring again to FIG. 2, the radially-accommodating structure 72 is radially moveable relative to the outer diameter of the first diaphragm plate 76. In the exemplary embodiment of the invention, the torque-transferring members 74 can be engaged with the outer diameter of the first diaphragm plate 76 for sliding radial movement. One or more of the torque-transferring members 74 can be urged radially outward when the planetary gear 56 passes by. The interaction between the teeth of the planetary gear 46 and teeth of the ring gear 56 can cause an outer profile of the ring gear 54 to deform radially outward. This deformation is elastic and is relatively small. The outer profile of the ring gear 56 can also change due to orbiting of the shaft 26/ring gear 56 about a centerline axis of rotation. Movement of one or more of the torque-transferring members 74 in response to changes in the radial profile of the ring gear 56 does not impart loading on the diaphragm plate 76. As a result, the stress loading on the diaphragm plate 76 is less complex and the time required to design a coupling between the two bodies 56 and 40 is substantially reduced. Shaft misalignment is also accommodated. So if the planetary gear set centerline is misaligned with the output shaft, this embodiment of the invention allows the flexibility to accommodate such misalignment.

Referring now to FIGS. 2 and 3, the exemplary embodiment of the socket assembly 66 can also include a carrier ring 88 and a biasing member 90. The carrier ring 88 can be fixed to the outer diameter of the first diaphragm plate 76 and encircle the radially-accommodating structure 72. The biasing member 90 can be positioned between the carrier ring 88 and the radially-accommodating structure 72. In the first exemplary embodiment of the invention, the biasing member 90 can urge all of the torque-transferring members 74 radially inward to engage the ring gear 56. The biasing member 90 can be elastically deformed if the one or more of the torque-transferring members 74 is urged radially outward due to a change in the radial profile of the ring gear 56. Thus, the torque-transferring members 74 would not be required to elastically deform to accommodate a change in the radial profile of the ring gear 56.

The exemplary biasing member 90 can be annular, encircling the axis of rotation of the ring gear 56. The exemplary biasing member 90 can also be corrugated. The exemplary biasing member 90 can be formed from any material capable of withstanding the operating environment, including but not limited to steel, aluminum and titanium.

Figure 5:
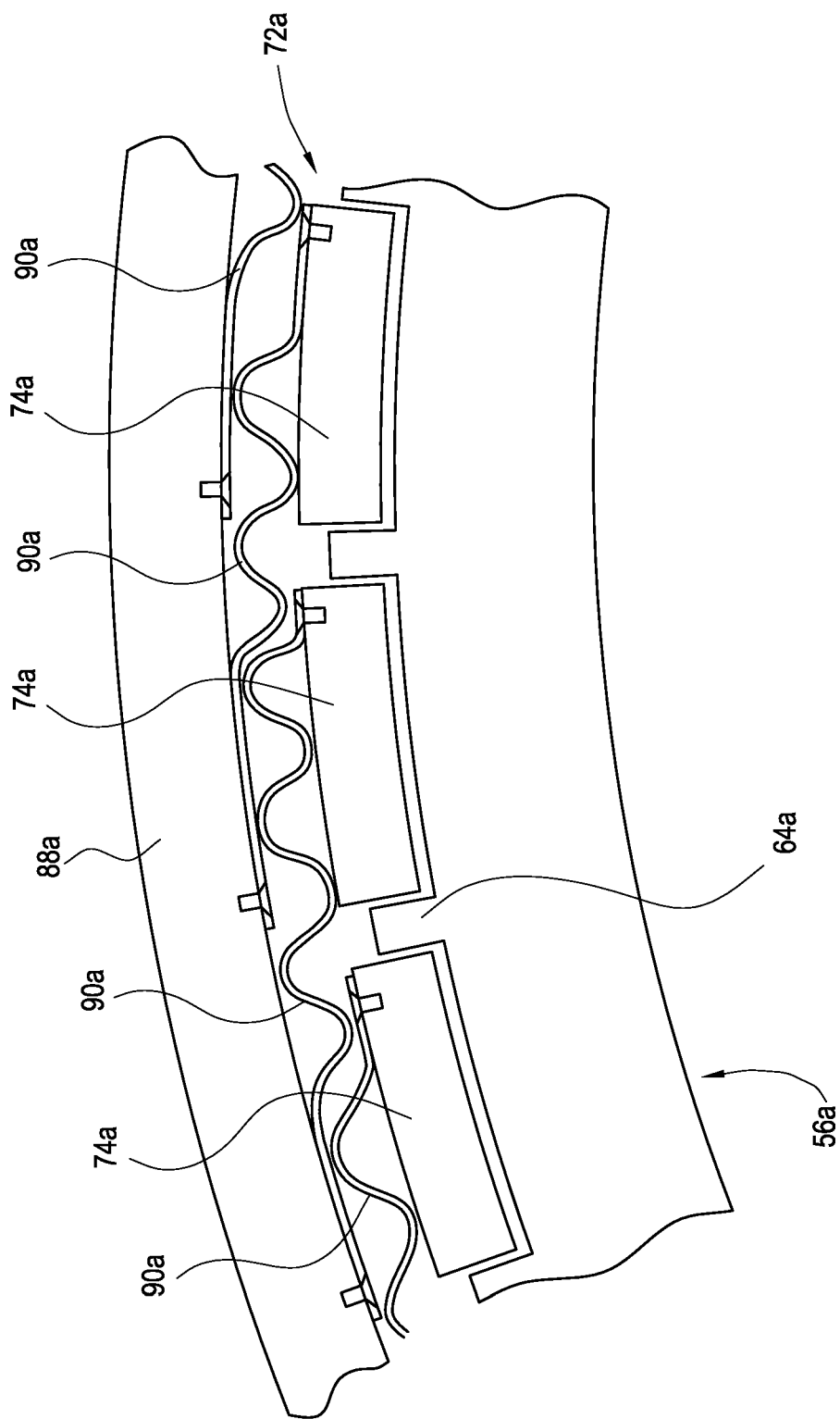
FIG. 5 is a cross-section analogous to FIG. 3 but of a second embodiment of the invention.

FIG. 5 shows a second embodiment of the invention in which a biasing member is defined by a plurality of individual biasing members 90*a*, each positioned between a carrier ring 88*a* and a radially-accommodating structure 72*a*. The second exemplary embodiment of the radially-accommodating structure 72*a* can be defined by a plurality of torque-transferring members 74*a*, each positioned between tabs 64*a* projecting radially outward from a ring gear 56a. Each of the torque-transferring members 74a can be fixed to one circumferential end of one of the biasing members 90a. The other circumferential ends of the biasing members 90a can be fixed to the carrier ring 88a. The biasing members 90a are shown as corrugated, but could be arcuate in cross-section.

Figure 6:
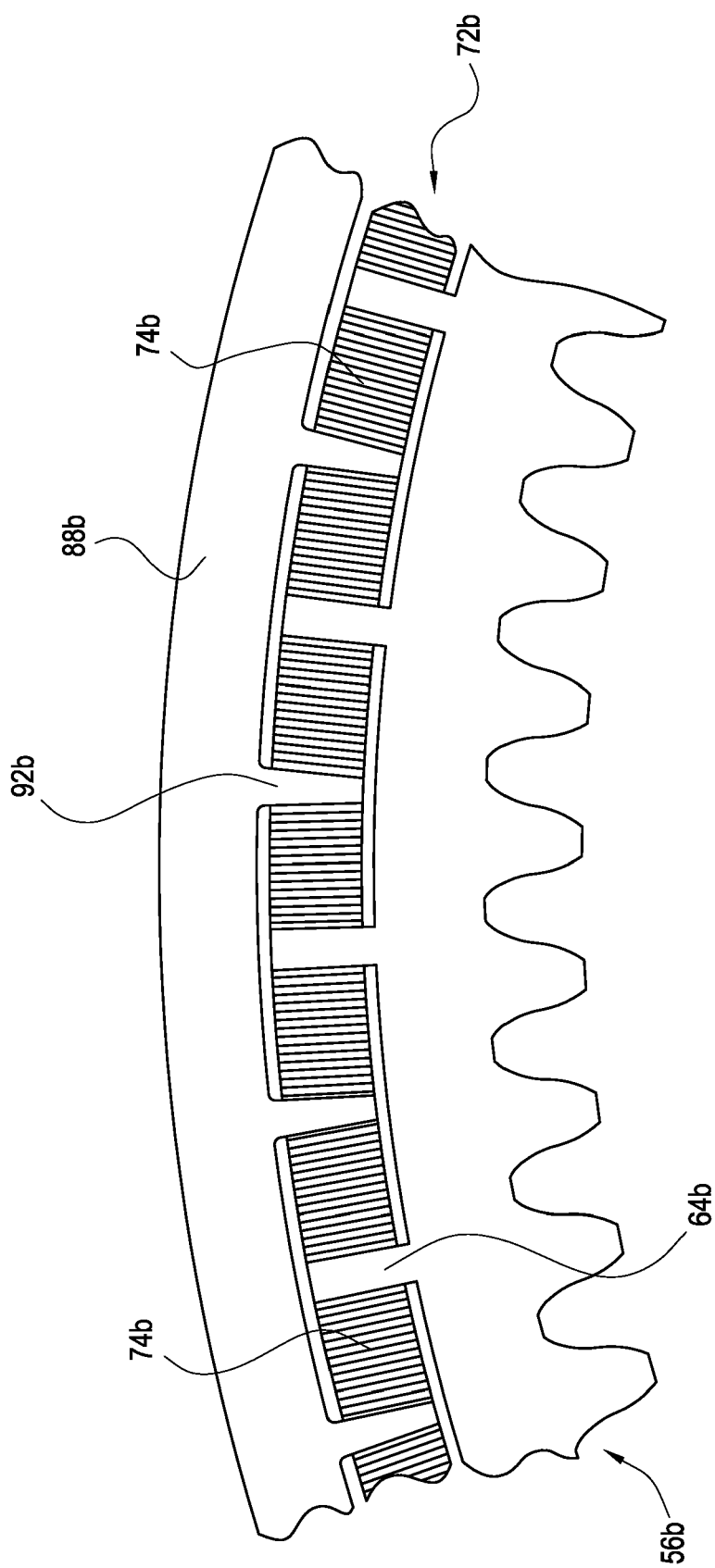
FIG. 6 is a cross-section analogous to FIG. 3 but of a third embodiment of the invention.

FIG. 6 shows a third embodiment of the invention in which a radially-accommodating structure 72b can be defined by a plurality of torque-transferring members 74b. Each torque-transferring members 74b can be positioned remotely from, or not in contact with, a diaphragm plate (not shown). In other words, the exemplary torque-transferring members 74b need not be in contact with a diaphragm plate. The torque-transferring members 74b can be positioned circumferentially between a tab 64b projecting radially outward from a ring gear 56b and a tab 92b projecting radially inward from a carrier ring 88b.

The torque-transferring members 74b can operate in a manner similar to turbine engine mounts which possess bi-directional stiffness. For example, the torque-transferring members 74b can possess high stiffness or high resistance to deformation in the circumferential direction so that torque will be transmitted. With respect to radial loads, occurring if one or more of the tabs 64b moves radially outward, the torque-transferring members 74b can possess low stiffness or low resistance to deformation so that a load will not be transmitted to the carrier ring 88b and thus transmitted to the diaphragm plate.

A first circumferential end of the torque-transferring member 74b engaged with the tab 64b can move radially outward or inward, a slave to the tab 64b. On the other hand, the second circumferential end of the torque-transferring member 74b engaged with the tab 92b can remain in position during movement of the circumferential end of the torque-transferring member 74b. Thus, the torque-transferring member 74b can at least partially move by deforming. The third exemplary radially-accommodating structure 72b can elastically deform in response to a change in the radial profile of the ring gear 56b. The torque-transferring members 74b can be formed by layering metal & rubber together or can be formed with a single material capable of bi-directional stiffness.

Figure 7:
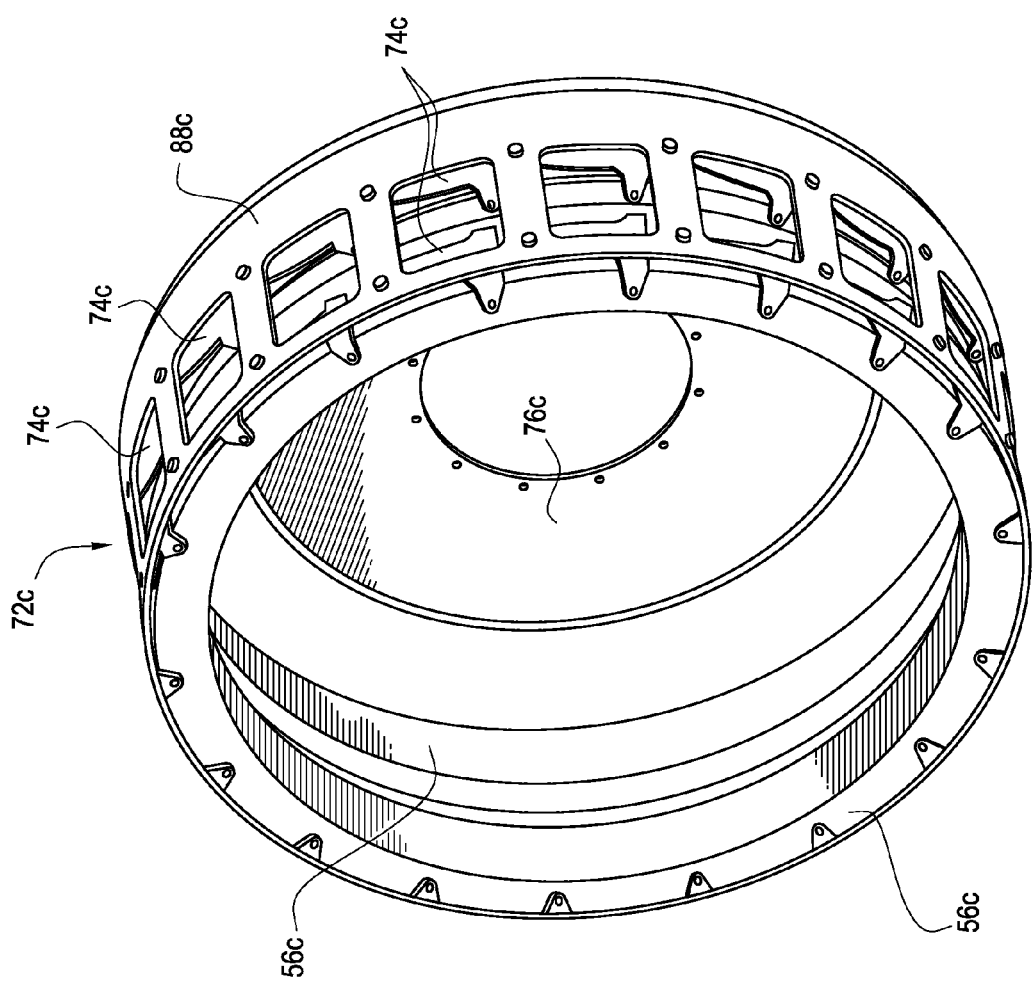
FIG. 7 is a perspective view of a fourth embodiment of the invention.

FIG. 7 shows a fourth embodiment of the invention in which a radially-accommodating structure 72c can be defined by a plurality of torque-transferring members 74c, each positioned between a carrier ring 88c and one of two ring gears 56c. The radially-accommodating structure 72c can include two rows of torque-transferring members 74c positioned axially adjacent to one another; one row for each of the ring gears 56c. The carrier ring 88c can be fixed to a diaphragm plate 76c.

Figure 8:
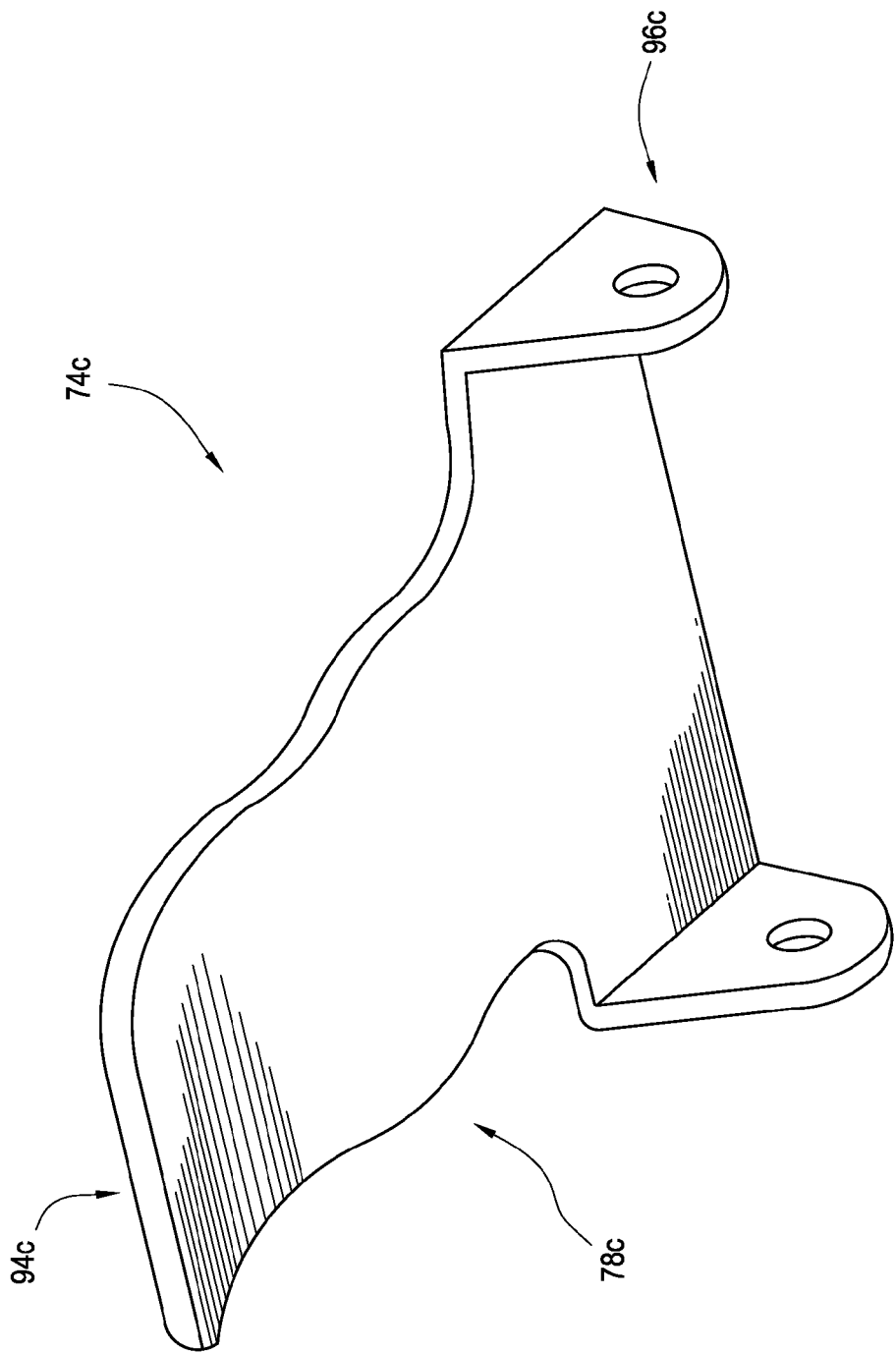
FIG. 8 is a perspective view of an exemplary torque-transferring member associated with the fourth exemplary embodiment of the invention.
Figure 9:
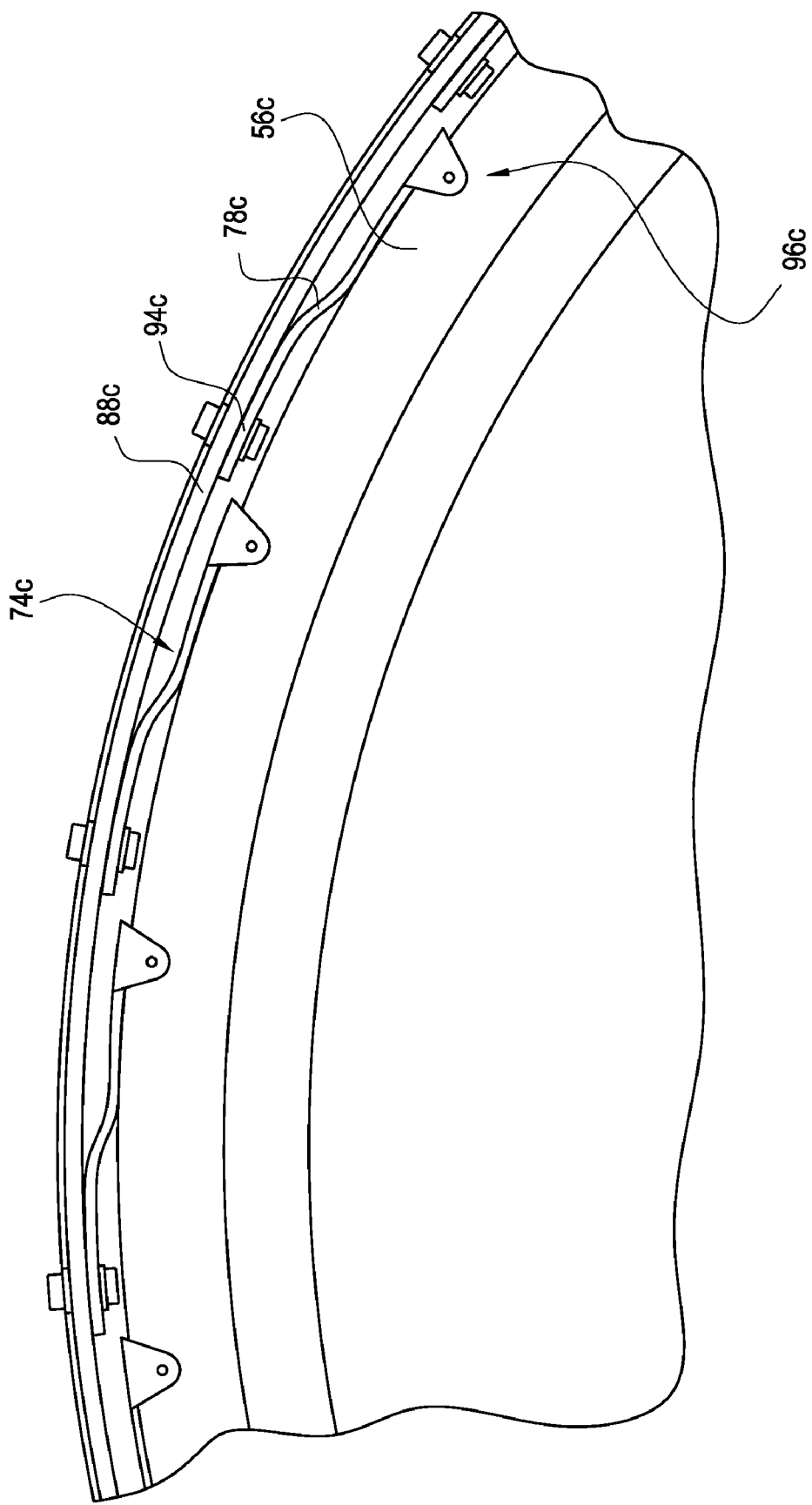
FIG. 9 is a cross-section analogous to FIG. 3 but of the fourth embodiment of the invention.

FIG. 8 is a perspective view of one of the torque-transferring members 74c. Each of the torque-transferring members 74c can include a body 78c extending between first and second ends 94c and 96c. As shown in FIG. 9, the torque-transferring members 74c of one row can be circumferentially spaced from one another between the carrier ring 88c and one of two ring gears 56c. In alternative embodiments of the invention, the torque-transferring members 74c could partially overlap one another. The first end 94c of each of the torque-transferring members 74c can be fixed to the carrier ring 88c and the other end 96c can be fixed to one of two ring gears 56c. The body 78c can function as spring, allowing the fourth exemplary radially-accommodating structure 72c to be self-biasing.

Referring again to FIG. 2, the socket assembly 66 of the first exemplary embodiment of the invention can be is supported at the first end 68 by the first diaphragm plate 76 and at the second end 70 by a second diaphragm plate 98. The fourth embodiment of the invention, shown in FIGS. 7-9, demonstrates that in other embodiments of the invention the socket assembly can be cantilevered off of the diaphragm plate 76c.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coupling assembly for transmitting torque between a first body and a second body comprising:
    a diaphragm plate extending radially between a radially inner periphery fixed for rotation with the first body to a radially outer periphery, said first diaphragm plate operable to elastically deform in response to changes in the axial positions of the first and second bodies relative to one another; and
    a socket assembly engaged with said radially outer periphery of said first diaphragm plate for concurrent axial movement in response to changes in the axial positions of the first and second bodies relative to one another and also for transmitting torque between the second body and said diaphragm plate, said socket assembly including a radially-accommodating structure operable to at least partially move in response to changes in an outer profile of the second body, and wherein said diaphragm plate and said socket assembly are engaged such that said socket assembly does not impart axial loading on said diaphragm plate in response to changes in the outer profile of the second body.

2. The coupling assembly of claim 1 wherein said radially-accommodating structure slidably contacts said diaphragm plate.

3. The coupling assembly of claim 1 wherein said radially-accommodating structure does not contact said diaphragm plate.

4. The coupling assembly of claim 1 wherein said radially-accommodating structure elastically deforms in response to a change in the outer profile of the second body.

5. The coupling assembly of claim 1 wherein said radially-accommodating structure does not elastically deform in response to a change in the outer profile of the second body.

6. The coupling assembly of claim 1 wherein said radially-accommodating structure is defined by a plurality of torque-transferring members moveable relative to one another.

7. The coupling assembly of claim 1 wherein said radially-accommodating structure biases at least part of itself radially inward.

8. The coupling assembly of claim 1 further comprising:
    at least one biasing member urging at least part of said radially-accommodating structure radially inward.

9. The coupling assembly of claim 8 wherein said at least one biasing member encircles said radially-accommodating structure.

10. The coupling assembly of claim 8 wherein said biasing member is corrugated.

11. The coupling assembly of claim 8 wherein:
said radially-accommodating structure is defined by a plurality of torque-transferring members moveable relative to one another; and
said at least one biasing member includes a plurality of biasing members, each biasing member urging at least one of said torque-transferring members radially inward.

12. The coupling assembly of claim 8 wherein said socket assembly further comprises:
a carrier ring encircling said radially-accommodating structure, wherein said biasing member is positioned between said carrier ring and said radially-accommodating structure.

13. A method comprising the steps of:
defining a path of torque-transferring between a first body and a second body;
positioning an axially-accommodating structure along the path wherein the axially-accommodating structure is operable to elastically deform in response to changes in the axial positions of the first body and the second body relative to one another;
positioning a radially-accommodating structure along the path wherein the radially-accommodating structure is operable to at least partially move in response to a change in an outer profile of the second body; and
bifurcating the axially-accommodating structure from the radially-accommodating structure such that the axially-accommodating structure is not subjected to axial loading in response to a change in the outer profile of the second body.

14. A propeller gear box assembly comprising:
an input shaft;
a sun gear arranged for rotation with said input shaft;
a plurality of planetary gears operable to orbit said sun gear;
a planetary gear carrier engaged with said plurality of planetary gears;
a first substantially cylindrical body being a ring gear surrounding said plurality of planetary gears;
a socket assembly operable to encircle and be coupled to said ring gear;
a first output shaft coupled to said planetary gear carrier;
a second output shaft spaced from said first output shaft; and
a first diaphragm plate extending radially between a radially inner periphery fixed to said second output shaft and a radially outer periphery axially fixed to said socket assembly, said first diaphragm plate operable to bend in response to changes in the axial positions of said second output shaft and said ring gear relative to one another, wherein said socket assembly includes a radially-accommodating structure being at least partially moveable relative to said radially inner periphery of said first diaphragm plate in response to a change in an outer profile of said ring gear.

15. The propeller gear box assembly of claim 14 wherein said radially-accommodating structure is defined by a plurality of torque-transfer members at least partially moveable relative to one another.

16. The propeller gear box assembly of claim 15 wherein said socket assembly further comprises:
a carrier ring fixed to said radially outer periphery of said first diaphragm plate and encircling said radially-accommodating structure, wherein said plurality of torque-transfer members are disposed radially between said carrier ring and said ring gear.

17. The propeller gear box assembly of claim 16 wherein each of said plurality of torque-transfer members is operable to elastically deform in response to a change in the outer profile of said ring gear.

18. The propeller gear box assembly of claim 16 further comprising:
at least one biasing member positioned radially inward of said carrier ring and operable to urge at least one of said plurality of torque-transfer members radially inward, said at least one biasing member operable to elastically deform circumferentially and radially.

19. The propeller gear box assembly of claim 16 wherein:
said ring gear includes a plurality of tabs projecting radially outward; and
said plurality of torque-transfer members are individually positioned between two adjacent tabs of said ring gear.

20. The propeller gear box assembly of claim 16 wherein said torque-transferring members provide stiffness in only a circumferential direction.

21. The propeller gear box assembly of claim 16 wherein said torque-transferring members provide stiffness in only a circumferential direction.

* * * * *